December 30, 1930

CROSS REFERENCE

UNITED STATES PATENT OFFICE

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA

GAS PURIFICATION

No Drawing.      Application filed June 11, 1926. Serial No. 115,408.

This invention relates to liquid purification of gas, such as coal gas, water gas and other gases, from hydrogen sulphide by means of alkaline solutions containing in suspension compounds of iron, nickel, or other metals the sulphides of which are normally insoluble. Such suspensions are useful in the aeration or revivification of the said alkaline solutions by reason of the fact that, due to their stoichiometrical or catalytic influence in the course of such aeration, free sulphur is liberated, thereby avoiding escape of hydrogen sulphide into the atmosphere, and rendering possible the recovery of a useful by-product. In furtherance of such processes, additions of organic materials have been made in efforts to sustain certain metallic compounds, such as hydroxides in solution, or in colloidal solution. There are several advantages in having the metallic compound in this state. The dispersion of the compound particles, and their diminution in size, increasing the surface exposed to contact, renders them much more effective in reaction or catalytically, the tendency for them to settle out is minimized, and the sulphur obtained is not contaminated with entrained foreign mineral material. However, it has been difficult if not impossible, to provide means for permanently maintaining such solutions in the presence of soluble sulphides.

Solutions of compounds, such as ferric hydrate, are comparatively easy to obtain: various agents have been proposed and are claimed to be satisfactory. However, large-scale tests over extended periods show that such prior solutions are not permanently stable in the presence of soluble sulphides, such as are absorbed by the alkaline absorbent agent from the gas being treated.

This has important effects, notably as regards the function of the metallic compound in the aeration or actification stage Catalysis, so far as I have been able to determine, of the said aeration stage, may be effected only by the sulphides of a metal, such sulphides being normally insoluble. Furthermore, in the case of iron certainly, and probably also in the case of nickel, such catalysis is possible only when the sulphide is present in solution, or in colloidal solution, or at any rate in a state not precipitatable by ordinary methods.

No one prior to applicant has succeeded in producing a solution of a normally insoluble metallic compound that is stable in alkaline solution in presence of dissolved sulphides.

An object of the present invention is to provide metallic compounds or mixtures, that are soluble in alkaline solutions in the presence of soluble sulphides and other salts. Such soluble compounds, which are not necessarily in molecular ratio, may be partly organic in nature. With respect to iron, the solutions of these materials may be designated as alkaline chalybeate solutions, stable in the presence of soluble sulphide, and capable of passing through an oxidation stage and into the sulphided form again, without loss in value or permanence.

An object of the present invention is to provide an easy and suitable method of preparing a catalyst for such or other processes. A further object is the production of such material that may be shipped or stored in the dry state, prior to being used.

Still other objects of the present invention are to provide a source of organic material useful in the preparation of alkaline metal-bearing materials containing soluble sulphide that is cheap and readily obtainable, and to provide an easy and rapid method of modifying the said material.

The invention further consists in such other new and useful improvements and has for further objects such other operative advantages or results as may be found to obtain in the processes hereinafter described or claimed.

The materials which I prefer to use in the manufacture of my product are starch, which is preferably modified by oxidation with a suitable oxidizing agent, such as nitric acid, and a compound of a metal the sulphide of which is normally insoluble, as for example, ferrous sulphate. In order that the invention may be clearly set forth and understood, I describe a preferred method of making the product of this invention.

104 parts of starch are thoroughly mixed in a kneading machine, or by hand, or in other suitable apparatus, with 140 parts of 52.3 per cent nitric acid. The mixture is heated until reaction proceeds of its own accord, which is indicated by the evolution of considerable quantities of red fume. During the course of reaction the said fume is preferably disposed of by conducting it through an earthenware tower packed with steel turnings, over which water is sprayed. When the reaction is complete, as indicated by the cessation of fuming, the mixture is allowed to cool. The product is a pale yellow liquid. This is now mixed with a suitable quantity of a soluble iron compound, for example, ferrous sulphate, which has been dried to remove enough of the water of crystallization to compensate for the moisture contained by the modified starch. The mixing may be accomplished in any suitable manner, and care should be taken to avoid heating of the mass during this stage. When thoroughly mixed, the product is a dry granular substance, in convenient form for shipping or storing, in barrels or the like.

It will be noted that I have not given any quantity of iron compound. This is because the amount to be used will depend upon the ratio desired of such compound to the alkali and/or organic agent, which ratio varies considerably according to use and results desired. As a specific example, however, when it is desired to use a mixture with a ratio of one part of starch to five parts of iron, considered as $Fe_2O_3$, 1750 parts of ferrous sulphate may be used with the amounts of starch and acid recited above.

The alkalinity of the gas purification solution, to which my product is to be added, is relied upon to accomplish the neutralization of my product, but where the material is to be added to a system containing no excess alkalinity, I prefer to neutralize the material prior to such additions. Such neutralization is preferably carried out by adding sufficient alkali solution to the material to cause an alkaline reaction. I may use sodium and/or ammonium hydroxide or carbonate, or any other alkali, for such neutralization, but ordinarily, I prefer to use the same alkali as is used in the system to which the material is to be added.

For gas purification purposes, I prefer to add enough of my material to produce a liquid containing 0.06 to 0.1 per cent of iron, considered as $Fe_2O_3$, or the equivalent thereof, 0.1 to 2.0 per cent organic material, and up to 3.0 per cent alkali. In general, however, low alkalinities, as for instance 1.0 per cent, are preferable to insure against undue consumption of alkali.

I have observed that the addition of large quantities of iron compound, as for example enough to produce a concentration of from 0.1 to 1.5 per cent of iron in the wash liquor, may be harmful in effect, causing a precipita-tion of the iron compound which it is desi to retain in the soluble form. Comparativ large concentrations of iron are therefore be avoided.

I have found that, when ferrous or ot compounds of low valence have been used the preparation of the dry material, t should be oxidized as soon as they are pla in the alkaline liquid, and before they placed in the solution containing soluble phides. In general, supplementary aerat is necessary, and also may be advantageo resorted to in order to agitate the liquid to insure thorough mixing thereof. may conveniently be accomplished in a p and/or separate aeration stage.

What happens upon neutralization is quite clear, but for convenience I may reg the resultant soluble compound in the cas iron, as sodium ferrisaccharate, though t is reason to believe that the material does exist precisely, or wholly in this form. this reason, I prefer to use the term alka chalybeate solutions, as above recited.

The invention is not limited in practic the use of starch and nitric acid as o organic substances, preferably carb drates, and other modifying and/or oxidi agents may be employed.

While, in the use of such materials in a purification process, I have found that t are incidentally some losses of the iro equivalent compound or catalyst, due to side reactions which inevitably occur, losses of the organic solution agent are paratively negligible. For this reason, a tions of a soluble metallic compound, fo ample, ferric sulphate, may be made f time to time as is necessary or conven without adding saccharate or other org material, which may be added in l amounts and/or at less frequent interval the proportion of organic material in compound prepared in the above manner be considerably decreased.

In practicing a gas purification proces cording to my invention, the gas to be pur is brought into intimate contact with a c lating wash liquor in order to absorb noxious impurities, such as hydrogen phide, and the sulphided wash liquor is jected to aeration, out of contact with th in the presence of the product of my in tion, and preferably with finely commin air, in order to regenerate the said liquor and liberate free sulphur which f to the surface, or if preferred, whic settled, or which may be filtered out. aerated wash liquor is then again used further purification of gas, completing cycle.

While I prefer to carry the aeratio oxidation stage to that point at which so sulphides have been eliminated, without dation of the metallic substance, I have f that the stability of my compounds is such that they may be partially oxidized without precipitation thereof. Upon coming once more into the presence of soluble sulphides, as for example in the absorption tower, the original state is regained.

The apparatus used for the purification of gas according to the improvements of the present invention does not differ from that ordinarily used in liquid purification of gas by means of an alkaline iron suspension.

The invention as hereinabove set forth is embodied in particular manner but may be variously embodied within the scope of the claims hereinafter made.

I claim:

1. A new composition of matter which consists of an iron compound intimately mixed with saccharate capable of sustaining the sulphide of said iron compound in solution in an alkaline solution in the presence of dissolved sulphides.

2. A new composition of matter consisting of a dry granular substance prepared by mixing an iron compound with an oxidized carbohydrate.

3. A new composition of matter prepared by mixing an iron compound with an oxidized starch.

4. A new composition of matter prepared by mixing an iron compound with a carbohydrate which has been modified by oxidation with nitric acid.

5. A new composition of matter prepared by mixing a ferrous compound with an oxidized starch, and oxidizing the resultant mixture to convert the iron present to the ferric state.

6. A new composition of matter prepared by mixing a ferrous compound with an oxidized starch, and oxidizing the resultant mixture to convert the iron present to the ferric state, and neutralizing the said mixture.

7. In the preparation of alkaline solutions of iron sulphides, the improvement which consists in commingling an iron compound with an oxidized starch.

8. In the preparation of alkaline solutions of iron sulphides, the improvement which consists in commingling an iron compound with an oxidized starch, and bringing the product into the presence of a soluble sulphide.

9. In a process for purifying gas from hydrogen sulphide by wash liquors, the improvement which consists in: maintaining a saccharate in the liquid used for such purpose and adding thereto as necessary an iron compound to maintain a content in said wash liquor of not more than 0.1% of iron in solution.

10. In a process for purifying gas from hydrogen sulphide by wash liquors, the improvement which consists in: maintaining 0.1 to 2.0 per cent of organic solution agent in the liquid used for such purpose, and adding thereto as necessary an iron comp to maintain a content in said wash liqu not more than 0.1% of iron in solution 11. In purification of gas from hydr sulphide by wash liquors the steps which sist in: washing the gas with a solution taining up to 0.1 per cent alkali, from to not more than 0.1 per cent of iron, from 0.1 to 2.0 per cent of an organic r rial capable of sustaining the said irc alkaline solution; and revivifying the solution by aeration out of contact witl gas.

12. In the preparation of a catalytic terial for the oxidation of sulphided alk liquids, the improvement which consist mixing an iron compound that is to pro the catalyst with an oxidized starch cap of maintaining the said catalyst in alk solution; and neutralizing the said mix 13. A process as claimed in claim 12 in which the iron compound that is to duce the catalyst is of lower than no valence and is raised to normal or a valence by oxidation in alkaline solutic 14. A process as claimed in claim 12 in which the compound that is to produc catalyst is ferrous sulphate.

15. A process as claimed in claim 12, in which the neutralization is effected by alkaline liquid which is to carry the cata 16. In the preparation of a catalytic terial for the oxidation of sulphided alk liquids, the improvement which consists mixing an iron compound that is to pro the catalyst with a material containing oxidized carbohydrate capable of maint ing the said catalyst in solution; and tralizing the same, the iron compound b in proportions to maintain a content in solution of not more than 0.1% of iron.

17. In the manufacture of a material t used for the preparation of alkaline cha eate solutions, the improvement which sists in: mixing a previously dried iron c pound with an oxidation product of sta in such proportion as to yield a solid proc 18. In the manufacture of a material t used for the preparation of alkaline cha eate solutions, the improvement which sists in: mixing a previously dried iron c pound with an oxidation product of sta in such proportion as to yield a solid p uct, and subsequently neutralizing said p uct.

19. A process of purifying gases of hy gen sulphide which consists in: washing gas with an alkaline wash liquor contaii an iron content of substantially not n than 0.1% and containing oxidized st capable of sustaining said iron in such w liquor, aerating the spent liquor and turning such aerated wash liquor for furt treatment of gas.

20. A process of purifying gases of hy gen sulphide which consists in: washing the gas with an alkaline liquid containing an oxidized carbohydrate and a sulphided compound of iron, regenerating the wash liquor with air and returning the regenerated wash liquor for further treatment of gas.

21. A process of regenerating sulphided wash liquors consisting in aerating such liquors while containing an oxidized carbohydrate and a sulphided compound of iron.

22. A process of regenerating sulphided wash liquors consisting in aerating such liquors while containing an iron compound in such proportions that precipitation of the sulphide thereof does not occur and an oxidized starch capable of sustaining such compound in solution in such liquor in the presence of soluble sulphides.

23. A process of regenerating sulphided wash liquors consisting in aerating such liquors while containing a normally insoluble iron sulphide and an oxidized starch capable of preventing precipitation of iron sulphide from the solution.

24. A process as claimed in claim 23, and in which the sulphide in solution is ferric sulphide.

25. A process as claimed in claim 23, and in which the iron content is present in concentration of from 0.01 to 0.10 per cent.

26. In the purification of gas of hydrogen sulphide the improvement which consists in washing the gas with an alkaline wash liquor containing iron sulphide and an oxidized starch to maintain the iron sulphide in stable solution.

27. Mixing starch with nitric acid; heating the mixture to effect their reaction; cooling the mixture after their reaction is complete; mixing this mixture with a dry soluble iron compound to produce a dry granular substance.

28. Mixing starch with nitric acid; heating the mixture to effect their reaction; cooling the mixture after their reaction is complete; mixing this mixture with a dry soluble iron compound to produce a dry granular substance; neutralizing such granular substance in solution and washing gas with it to remove noxious constituents.

29. Mixing starch with nitric acid; heating the mixture to effect their reaction; cooling the mixture; mixing this mixture with dry ferrous sulphate to produce a dry granular substance.

30. As a product, a mixture obtained by mixing oxidized starch and dry ferrous sulphate.

31. As a product a mixture obtained by mixing starch, nitric acid and ferrous sulphate.

32. As a dry, solid product, a mixture of an oxidized carbohydrate, an iron compound.

33. As a product, a mixture of an iron compound and an oxidized starch which is capable of sustaining the iron compound an alkaline solution, in the presence of so ble sulphides.

34. The process of purifying gas from dregen sulphide which comprises subject the gas to contact with an alkaline liq containing iron sulphide in such quan that said iron sulphide is not precipita and a saccharate for maintaining the s sulphide in solution in the said liquid.

35. Preventing iron sulphide from cipitating in alkaline solution by means oxidized starch and by the maintenance the iron content therein at substantially than one per cent of iron.

In testimony whereof I have hereunto my hand.

GILBERT E. SEI